(12) United States Patent
Havewala et al.

(10) Patent No.: US 8,713,270 B2
(45) Date of Patent: Apr. 29, 2014

(54) EFFICIENT FILE SYSTEM METADATA SCANNING USING SCOPED SNAPSHOTS

(75) Inventors: Sarosh C. Havewala, Kirkland, WA (US); Neal R. Christiansen, Bellevue, WA (US); Lane Haury, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 134 days.

(21) Appl. No.: 13/237,952

(22) Filed: Sep. 21, 2011

(65) Prior Publication Data

US 2013/0073819 A1 Mar. 21, 2013

(51) Int. Cl.
*G06F 13/00* (2006.01)
*G06F 13/28* (2006.01)

(52) U.S. Cl.
USPC ...... 711/162; 711/E12.103; 714/48; 707/690; 707/821

(58) Field of Classification Search
USPC ............. 711/162, E12.103; 714/48; 707/690, 707/821
See application file for complete search history.

(56) References Cited

U.S. PATENT DOCUMENTS

| | | | |
|---|---|---|---|
| 6,647,473 B1 | 11/2003 | Golds et al. | |
| 6,820,099 B1 | 11/2004 | Huber et al. | |
| 6,993,539 B2 | 1/2006 | Federwisch et al. | |
| 7,069,401 B1 | 6/2006 | Noonan et al. | |
| 7,143,249 B2 | 11/2006 | Strange et al. | |
| 7,395,378 B1 | 7/2008 | Pendharkar et al. | |
| 7,539,707 B2 | 5/2009 | Prahlad et al. | |
| 7,548,939 B2 | 6/2009 | Kalach et al. | |
| 7,552,115 B2 | 6/2009 | Kalach et al. | |
| 7,603,391 B1 | 10/2009 | Federwisch et al. | |
| 7,685,388 B1 | 3/2010 | Jiang | |
| 7,694,191 B1 * | 4/2010 | Bono et al. | 714/48 |
| 7,743,031 B1 | 6/2010 | Cameron et al. | |
| 7,783,598 B1 | 8/2010 | Malaiyandi et al. | |
| 7,962,528 B1 | 6/2011 | Pasupathy et al. | |
| 2006/0206536 A1 * | 9/2006 | Sawdon et al. | 707/200 |
| 2006/0282471 A1 * | 12/2006 | Mark et al. | 707/200 |
| 2008/0222078 A1 * | 9/2008 | Godbole | 707/1 |
| 2008/0222152 A1 * | 9/2008 | Godbole | 707/8 |

OTHER PUBLICATIONS

Meyer, et al., "A Study of Practical Deduplication", Retrieved at <<http://www.cs.ubc.ca/~dmeyer/msfs_fast11-final.pdf>>, FAST, Feb. 15-17, 2011, pp. 13.
"Proactive Error Scan and Isolated Error Correction", Dec. 17, 2010, Pages.

* cited by examiner

*Primary Examiner* — Edward Dudek, Jr.
(74) *Attorney, Agent, or Firm* — John Jardine; Micky Minhas (57) ABSTRACT

Volumes of a file system remain online, and thus available for use, while being proactively error scanned for corruptions thereon. A snapshot of each volume being proactively error scanned is maintained for the volume during the proactive error scanner processing of the volume. Proactive error scanner processing only requires access to file system metadata to correctly process a volume for an identification of the corruptions thereon, and thus, a snapshot of the entire volume nerd not be generated nor maintained. The clusters of a volume that store file system metadata are identified and only these clusters are maintained in a scoped snapshot for the volume during proactive error scanning of the volume.

17 Claims, 5 Drawing Sheets

EFFICIENT FILE SYSTEM METADATA SCANNING USING SCOPED SNAPSHOTS

CROSS-REFERENCE TO RELATED APPLICATIONS

This application is related to commonly assigned, co-pending U.S. patent application Ser. No. 12/970,954, entitled "Proactive Error Scan And Isolated Error Correction", which is incorporated herein by reference in its entirety.

BACKGROUND

File systems utilize data structures, also referred to as the file system on-disk format, to persist, i.e., maintain and organize, data to stable storage, e.g., a volume, disk, hard drive, etc. File systems access the data and interpret these data structures to store and retrieve data for users and applications, or procedures or computer programs, e.g., when executing software instructions or computer code.

Error scanning is performed for the volumes of a file system in order to proactively identify corruptions in their data structures. A proactive error scanning process involves generating snapshots for volumes of the file system and performing actions on the data structures in the volume snapshots to identify existing corruptions. In embodiments the proactive error scanning process executes while the file system volumes remain online and, therefore, accessible to other users and applications.

However, there are issues introduced by the proactive error scanning process' use of a volume snapshot. For example, the copy-on-write mechanism typically employed to generate and maintain the snapshot view of a volume is expensive in terms of I/O, i.e., input/output, processing costs. This in turn imposes performance penalties on the I/O that applications are attempting to perform with the underlying real volume while the proactive error scanner uses the volume snapshot.

Moreover, as applications perform I/O operations on the real volume during proactive error scanning the copy-on-write mechanism saves the changed data blocks away into a difference, i.e., diff, area on the volume. As the number of changed data blocks grows the volume space required for the diff area increases. This can negatively impact overall file system performance as it has increasingly less free volume space for application usage. Too, if the diff area becomes too large older snapshots will have to be deleted to make room for the newer changed blocks. In some cases, the snapshot used by the proactive error scanner may itself have to be deleted and the proactive error scanner will have to be prematurely terminated and then subsequently restarted again from the beginning, utilizing valuable system time and resources.

Thus it is desirable to minimize, i.e., scope, the snapshot of the volume used by the proactive error scanner to those sections of the volume that are actually utilized by the proactive error scanner. It is further desirable to determine the scope of the volume snapshot for use by proactive error scanner in a timely manner in order to further minimize volume error detection processing effects on the file system's performance and resources.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for determining for a file system volume that is undergoing proactive error scanning while the volume is online and available to other applications and users those volume clusters that are to be snapshotted during the entire proactive error scanning process. In an embodiment proactive error scanning is performed on a volume to determine if the volume has any corruptions. In an embodiment proactive error scanner processing need only reference file system metadata to perform its functionality. Thus, in an embodiment an entire volume, i.e., user data and unused volume clusters, need not be snapshotted for the duration of proactive error scanner processing.

In an embodiment a volume undergoing proactive error scanner processing is snapshotted in its entirety during a first, nominal time processing, phase to ensure the volume's file system metadata can be relied on to accurately identify the file system metadata on the volume. In an embodiment, during subsequent phases when the proactive error scanner is actively processing the file system metadata of a volume scanning for corruptions, only those volume clusters containing file system metadata continue to be snapshotted.

In an embodiment during the first proactive error scanner processing phase a snapshot bitmap is generated and populated that identifies the volume clusters that contain file system metadata, and thus are to continue to be snapshotted for the duration of proactive error scanner processing on the volume. In this embodiment the generated snapshot bitmap also, de facto, identifies the volume clusters that contain user data or are currently free, i.e., contain no meaningful data, and thus do not need to continue to be snapshotted for the remainder, i.e., any subsequent phases, of proactive error scanner processing on the volume.

BRIEF DESCRIPTION OF THE DRAWINGS

These and other features will now be described with reference to the drawings of certain embodiments and examples which are intended to illustrate and not to limit, and in which.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
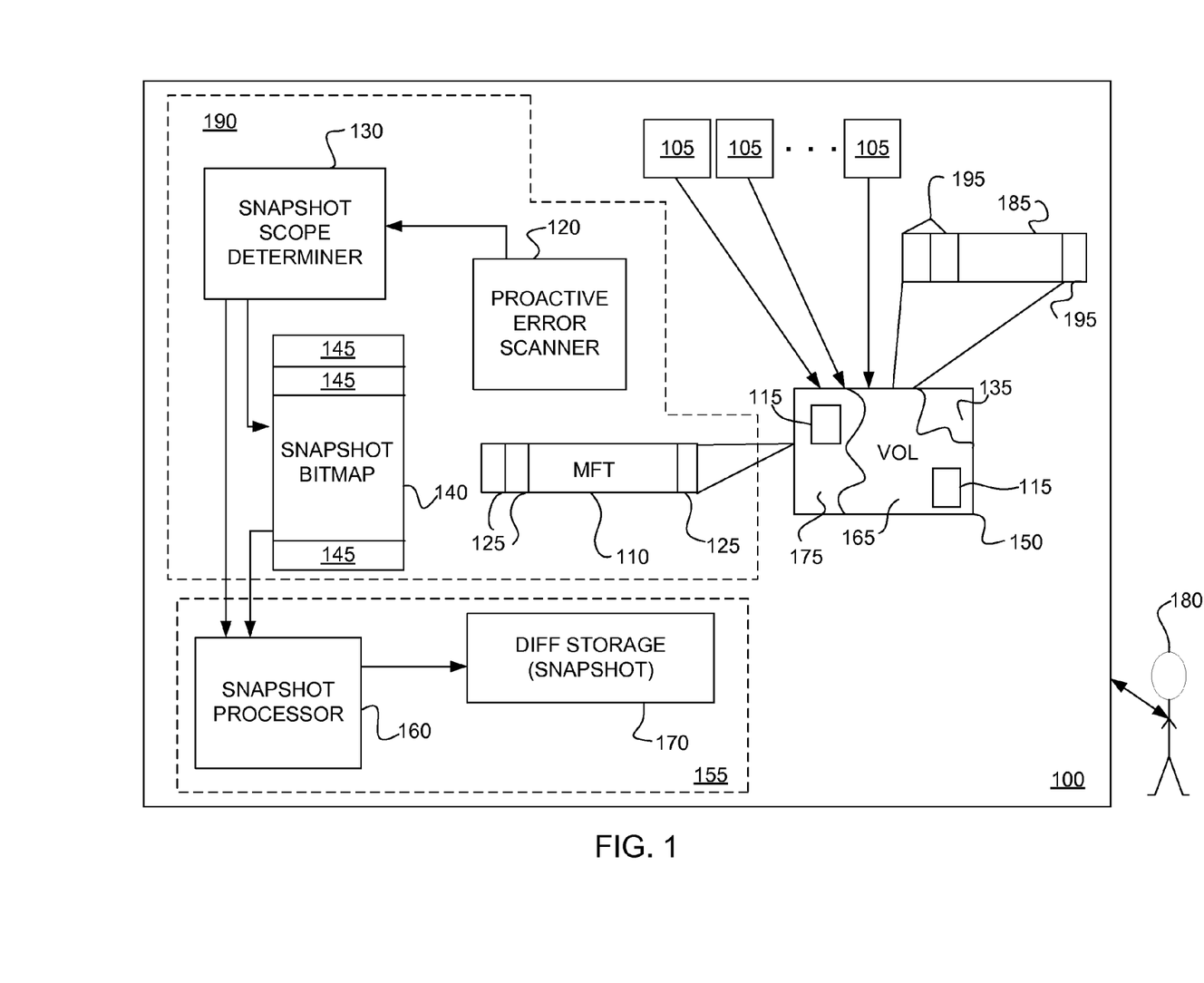
FIG. 1 depicts an embodiment computing device system supporting proactive error scanning with scoped snapshots.

FIG. 1 depicts an embodiment computing device system 100 supporting scoping a snapshot for use with corruption detection processing for volume 150 errors. In an aspect of this embodiment computing device system 100 supports scoping a snapshot for use with proactive error scanner 120 processing for volume 150 errors. Embodiment proactive error scanner 120 processing is discussed in commonly assigned, co-pending U.S. patent application Ser. No. 12/970, 954, entitled "Proactive Error Scan And Isolated Error Correction", which is incorporated herein by reference in its entirety.

In an embodiment a computing device system 100 has a file system 190 that sits on top of a storage stack 155 containing one or more volumes 150 of stored information. In an embodiment the storage stack 155 presents to the file system 190 a storage device as a linear array of blocks, or sectors 185. In an embodiment the file system 190 allocates and addresses the linear array of blocks of the storage device at a cluster 195 granularity and utilizes the clusters 195 to store data, e.g., Metadata 175 and non-file system metadata 165, as further discussed below.

In an embodiment the snapshotting and snapshot scoping discussed herein occurs at the storage stack 155 of the computing device system 100. In an embodiment the file system 190 of the computing device system 100 informs the storage stack 155 of the computing device system 100 what is to be scoped in, and thus out, of a snapshot 170 for use with corruption detection processing for volume 150 errors.

As noted, in an embodiment the computing device system 100 has one or more volumes 150 that store objects 115, i.e., files of programs and/or data, for use by processing applications, tasks, programs, routines, etc, collectively referred to as applications, or app(s), 105, and users 180. In an embodiment the data on any volume 150 can be metadata 175, also referred to herein as file system metadata 175, and data 165 other than file system metadata, also referred to herein as non-file system metadata 165. In an aspect of this embodiment non-file system metadata 165 is user data. For ease of discussion non-file system metadata 165 is also generically referred to as user data 165 herein.

In an embodiment a volume 150 is a range of storage blocks. In an embodiment a sector 185 is the physical address unit for a volume 150, e.g. there are five hundred twelve (512) bytes per sector 185. In an embodiment a cluster 195 is a unit of volume storage allocation that is a predetermined, n, number of sectors 185 in size. In an embodiment a cluster 195 is the file system's granularity of allocating and addressing objects 115 on a volume 150.

In an embodiment a cluster 195 of a volume either stores user data 165 or file system metadata 175, or it contains no data and is five space 135.

An embodiment file system 190 of an embodiment computing device system 100 has a corruption detection 120 component that has the capability to identify corruptions, i.e., errors, on objects 115 stored on its volumes 150. In an aspect of this embodiment the corruption detection 120 component is the proactive error scanner 120.

In an embodiment the corruption detection 120, also referred to herein as the proactive error scanner 120, is a software application task that is initiated to execute by the file system 190 and has the capability to proactively scan, i.e., check, for errors, or corruptions, associated with the objects 115 stored on the volumes 150 of the computing device system 100. In an embodiment the proactive error scanner 120 performs actions that are designed to identify, i.e., detect, corruptions on volumes 150.

In an embodiment the proactive error scanner 120 operates while the volumes 150 remain online, and thus, each of the volumes 150 are available for use by other applications 105 and users 180 while the proactive error scanner 120 is executing. In an embodiment the amount of time it takes for the proactive error scanner 120 to perform an online scan of a particular volume 150 is proportional to the number of objects 115 resident on the volume 150 at the time of the scan. A volume 150, while being scanned, remains online and available for other use. In this embodiment the proactive error scanner 120 processing does not affect volume 150 accessibility.

In an embodiment the proactive error scanner 120 is initiated, or otherwise invoked, to run, i.e., execute, upon the detection of a corruption in a volume 150. In a second embodiment the proactive error scanner 120 is initiated to run at identified time intervals if a corruption has been previously detected in at least one volume 150 of the computing device system 100.

In a third embodiment the proactive error scanner 120 is scheduled to execute at some time interval, e.g., once a day at midnight, once a week on Sunday night at eleven-thirty p.m., once a month on the first Sunday night of the month at one o'clock a.m., etc., as programmed by a system administrator 180 or user 180, also collectively referred to herein as user 180. In an aspect of this third embodiment meaningful defaults are established within the computing device system 100 for ensuring that the proactive error scanner 120 executes at some time interval, e.g., at least once a month, etc., upon circumstances where other time intervals are not properly established, e.g., have not been programmed by a user 180, are inappropriate or are in error, e.g., only once a year, etc., have been inadvertently deleted or corrupted, etc.

In a fourth embodiment the proactive error scanner 120 is launched, i.e., invoked to execute, when commanded by a user 180.

In an embodiment a snapshot 170 of the volume 150 to be checked by the proactive error scanner 120 is generated and maintained during the proactive error scanner 120 processing of the volume 150. In an embodiment during a first phase of the proactive error scanner 120 processing the volume snapshot 170 is a snapshot of the entire volume 150. In an embodiment during a subsequent phase of the proactive error scanner 120 processing the volume snapshot 170 is a scoped snapshot of just the metadata 175 for the volume 150, as further discussed below.

In an embodiment a volume snapshot 170 is created by a combination of the unchanged portions of a volume 150 and copy-on-writes that are executed when an app 105 writes to a volume object 115. In a general sense, in an embodiment a copy-on-write copies the object 115 for which a write has been issued by an app 105 to a diff storage area 170, i.e., the volume snapshot 170, on the volume 150 prior to executing the write. In this manner a volume snapshot 170 maintains the state of the volume 150 at the time proactive error scanner 120 begins processing the volume 150; i.e., the volume snapshot 170 is the unchanged portions of the volume 150 as well as copies of portions of the volume 150, i.e., objects 115, that are changed, via I/O (Input/Output) writes, during the time period that the proactive error scanner 120 is executing.

In an embodiment a volume snapshot 170 is initiated when proactive error scanning 120 begins processing the respective volume 150 checking for file system errors thereon.

In an embodiment each volume 150 of the computing device system 100 has an associated master file table, also referred to as an MFT herein, 110.

In an embodiment an MFT 110 for a volume 150 has a record 125 for each object 115 created and resident on the volume 150. In an aspect of this embodiment each MFT record 125 is fixed length. In an aspect of this embodiment each record 125 of the MFT 110 is one thousand twenty four (1K) bytes in size.

Figure 2:
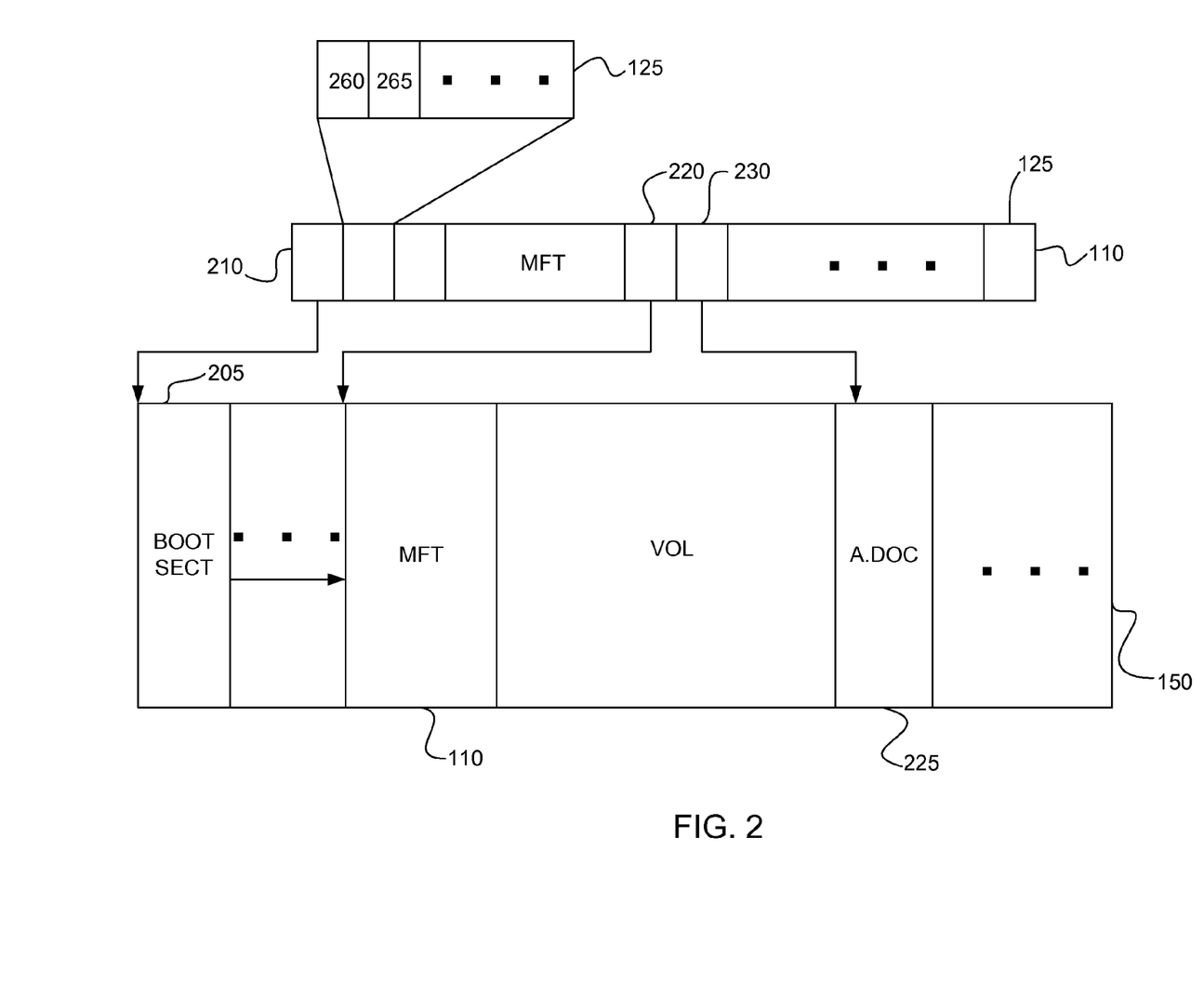
FIG. 2 depicts an embodiment exemplary computing device system volume, master file table and corresponding snapshot bitmap.

As noted, in an embodiment there is MFT record 125 for each object created and resident on the respective volume 150, including an MFT record 125 for a boot sector 205, further discussed below, and an MFT record 125 for the MFT 110 itself.

In an embodiment each MFT record 125 contains information about the volume object 115 for which it is generated. Referring to FIG. 2, an embodiment MFT record 125 has an object descriptor field 260 which identifies the object type, e.g., directory, bitmap, document file, app, etc. In an aspect of this embodiment the object descriptor field 260 of FIG. 2 identifies whether the corresponding object 115 of FIG. 1 is file system metadata 175 or user data 165.

As shown in FIG. 2 in an embodiment each MFT record 125 has an extent field, or field entries, 265. In an embodiment the extent field 265 of an MFT record 125 of FIG. 2 identifies the cluster(s) 195 depicted in FIG. 1 on the volume 150 where the respective object 115 is stored and how these volume object clusters 195 are chained together. In an aspect of this embodiment the MFT record extent field 265 of FIG. 2 contains the beginning cluster number where the object 115 depicted in FIG. 1 is stored on the volume 150 and the number of clusters 195 that the object 115 utilizes for storage.

In embodiments an MFT record 125 can contain other and/or additional fields and/or field entries, e.g., the corresponding object name, the object's file identifier, the owner of the object, etc. In embodiments the fields of an MFT record 125 can be organized in alternative orders.

In other embodiments structures other than a MFT 110 are utilized for storing information about a volume's object 115, e.g., a list or linked lists of object information, etc.

Referring again to FIG. 1, and as previously noted, in an embodiment a cluster 195 of a volume 150 either has an object 115 stored thereon or otherwise is unused 135, i.e., is free storage or free space.

In an embodiment there are two types of objects 115 stored on a volume 150: file system metadata 175 and non-file system metadata 165 which is data that is not file system metadata 175. In an aspect of this embodiment non-file system metadata 165 includes user data and is also referred to herein generically as user data 165. In an embodiment user data 165 is those volume objects 115 created pursuant to a user 180 issuing commands via one or more apps 105. In an embodiment file system, metadata 175 is those volume objects 115 generated for administration and maintenance of the volume 150. In an embodiment file system metadata 175 includes the boot sector 205, e.g., sector zero (0) of the volume 150, the MFT 110 for the volume 150, which is stored on the volume 150, volume directories, etc. In an embodiment user data 165 utilizes a generally significantly larger proportion of a volume 150 than the volume's file system metadata 175.

In an embodiment the proactive error scanner 120 is concerned only with a volume's metadata 175 when it is processing the volume 150 scanning for corruptions.

An embodiment computing device system 100 has a snapshot scope determiner component 130. In an embodiment the snapshot scope determiner 130 is a software application task that is initiated to execute by the file system 190 of the computing device system 100 and has the capability to identify which clusters 195 of a volume 150 are to be maintained within a snapshot 170 for use by the proactive error scanner 120, and, coincidentally, those clusters 195 of a volume 150 that do not need to be maintained within the snapshot 170 utilized by the proactive error scanner 120.

In an aspect of this embodiment the snapshot scope determiner 130 identifies which clusters 195 of a volume 150 currently store metadata 175, which is reviewed by the proactive error scanner 120 when it is processing a volume 150 scanning for corruptions thereon. In this aspect of this embodiment the snapshot scope determiner 130 also, de facto, identifies the clusters 195 of a volume 150 that currently store user data 165 or are not currently being used, and are therefore not utilized, or otherwise not scanned or reviewed, by the proactive error scanner 120. In this aspect of this embodiment the snapshot scope determiner 130 identifies metadata clusters 195 as these contain the objects 115 that the proactive error scanner 120 is concerned with and thus are the volume clusters 195 that snapshots 170 will continue to be maintained for during proactive error scanner 120 processing.

In an embodiment the snapshot scope determiner 130 is a separate software application from the proactive error scanner 120 and is invoked to execute by the proactive error scanner 120. In an alternative embodiment the snapshot scope determiner 130 is a component of the proactive error scanner 120, e.g., a routine(s) within the proactive error scanner 120 application.

In an embodiment the snapshot scope determiner 130 is invoked to execute during a first phase of execution of the proactive error scanner 120. In an embodiment the snapshot scope determiner 130 generates a snapshot bitmap 140 that when completed identifies the volume clusters 195 that contain metadata 175. In an aspect of this embodiment the completed snapshot bitmap 140 also, de facto, identifies the volume clusters 195 that currently contain user data 165 and those volume clusters 195 that are currently unused 135.

In an embodiment the snapshot scope determiner 130 generates, or alternatively updates, a snapshot bitmap 140 for use by a snapshot processor 160 to identify which volume clusters 195 to snapshot, as further discussed below.

In an embodiment the snapshot bitmap 140 has a bit 145 for each volume cluster 195. In an embodiment the snapshot bitmap bits 145 are sequentially arranged in the same order as the volume clusters 195; i.e., the first bit 145 is for the first volume cluster 195, the second bit 145 is for the second volume cluster 195, etc.

In alternative embodiments the snapshot bitmap 140 has a bit 145 for different size sections, i.e., scoping granularity sections, of a volume 150, e.g., one snapshot bitmap bit 145 for every two volume clusters 195, one snapshot bitmap bit 145 for every five volume clusters 195, etc. In an aspect of these alternative embodiments the snapshot bitmap bits 145 are sequentially arranged in the same order as the scoping granularity sections; i.e., the first bit 145 is for the first volume scoping granularity section, the second bit 145 is for the second volume scoping granularity section, etc.

In an embodiment a bit 145 in the snapshot bitmap 140 is set to zero (0) if the bit 145 is for a volume cluster 195 that either has user data 165 or is unused 135. In an alternative embodiment a bit 145 in the snapshot bitmap 140 is set to one (1) if the bit 145 is for a volume cluster 195 that either has user data 165 or is unused 135.

In an embodiment the snapshot scope determiner 130 generates, or alternatively updates, the snapshot bitmap 140 with each bit 145 initially set to the value indicating that the corresponding cluster 195 is to be included in the volume snapshot 170. In this embodiment this initial snapshot bitmap 140 is provided to, or otherwise made accessible to, the snapshot processor 160 which will snapshot each cluster 195 of the volume 170 during a first phase of proactive error scanner 120 processing as each snapshot bitmap bit 145 is set to the value indicating the corresponding cluster 195 is to be included in the volume snapshot 170.

In this embodiment the snapshot scope determiner 130, as it reviews the MFT records 125, thereafter sets the bits 145 of the snapshot bitmap 140 corresponding to volume clusters 195 that do not contain file system metadata 175, i.e., either contain user data 165 or are unused 135, to the alternative value from their current one, i.e., the value indicating that the cluster 195 is not to be included in the volume snapshot 170. In this embodiment the updated snapshot bitmap 140 is provided to, or otherwise made accessible to, the snapshot processor 160 which will then only snapshot those clusters 195 of the volume 170 during a subsequent phase of proactive error scanner 120 processing whose snapshot bitmap bits 145 remain set to the initial value indicating inclusion within the volume snapshot, i.e., those clusters 195 that contain metadata 175.

In an alternative embodiment the snapshot processor 160 generates its own initial snapshot bitmap for a volume 170 to be snapshotted, setting each bit to the value indicative of corresponding cluster 195 inclusion within the volume snapshot 170. In this manner the entire volume 170 is snapshotted when the snapshot processor 160 initially begins processing, i.e., snapshotting, a volume 150. In this alternative embodiment if the snapshot scope determiner 130 successfully reviews and validates the MFT 110 for a volume 170 and the WEFT 170 itself is not found to have any corruptions, the snapshot scope determiner 130 will then provide an updated snapshot bitmap 140 to the snapshot processor 160 for use in snapshotting the volume 150 in subsequent phase(s) of the proactive error scanner 120 processing of the volume 150.

In a second alternative embodiment the snapshot processor 160 snapshots an entire volume 150 unless it receives, or otherwise is provided access to, a snapshot bitmap 140 for the volume 150. Upon receiving a snapshot bitmap 140, e.g., from the snapshot scope determiner 130, in this second alternative embodiment the snapshot processor 160 utilizes the snapshot bitmap 140 to determine which clusters 195 of the volume 150 to maintain in the now scoped snapshot 170 for the volume 150.

In all of these embodiments the snapshot bitmap 140 identifies the clusters 195 of a volume 150 containing metadata 175 that is to continue to be included within a volume snapshot 170 during proactive error scanner 120 processing. In all of these embodiments the snapshot bitmap 145 also, de facto, identifies the clusters 195 of a volume 150 that either contain user data 165 or are free, i.e., unused, and which are not to continue to be included within the volume snapshot 170 during subsequent phases of the proactive error scanner 120 processing of the volume 150.

In an embodiment the first sector 185 of a volume 150 is a boot sector 205 as shown in FIG. 2. In an embodiment the boot sector 205 points to, or otherwise indicates the location of, the volume's MFT 110 which is stored somewhere in one or more clusters 195 of the volume 150.

In an embodiment the snapshot scope determiner 130 utilizes the boot sector 205 to determine the location of the MFT 110 in a volume 150 that the proactive error scanner 120 is currently processing for corruptions. In an embodiment, upon locating the MFT 110 the snapshot determiner 130 sequentially reviews each MFT record 125 to validate the MFT record 125, including the MFT record 210 for the boot sector 205, the MFT record 220 for the MFT 110 itself, and all other MFT records 125 for each volume object 115, e.g., MFT record 230 for an exemplary volume user data object a.doc 225. In an aspect of this embodiment the snapshot scope determiner 130 reviews and validates each MFT record 125 as the MFT 110 itself is file system metadata 175 that can have corruptions therein.

If the snapshot scope determiner 130 determines that an MFT record 125 is valid, i.e., is free of errors, in an embodiment the snapshot scope determiner 130 ascertains whether the MFT record 125 is for an object 115 that is file system metadata 175 or, alternatively, an object 115 that is user data 165.

If the valid MFT record 125 is for file system metadata 175 then in an embodiment the snapshot scope determiner 130 looks at the MET record's extent field, or field entries, 265 to identify the volume clusters 195 where the respective object 115 is stored. As previously noted, in an embodiment the snapshot scope determiner 130 sets each bit 145 in the snapshot bitmap 140 corresponding to a cluster 195 utilized by the object 115 for the MFT record 125 currently being processed to the value indicative of the cluster's inclusion within the volume snapshot 170.

In an embodiment, when the snapshot scope determiner 130 concludes processing the records 125 of the MFT 110 each bit 145 in the snapshot bitmap 140 that corresponds to a cluster 195 that has been determined to currently store an object 115 that is file system metadata 175 is set to a first value, e.g., one (1), or, alternatively, zero (0). In an embodiment, when the snapshot scope determiner 130 concludes processing the records 125 of the MFT 110 each bit 145 in the snapshot bitmap 140 that corresponds to a cluster 195 that has been determined to currently store an object 115 that is user data 165 is set to the second, alternative value, e.g., zero (0), or, alternatively, one (1). In an embodiment, when the snapshot scope determiner 130 concludes processing the records 125 of the MET 110 each bit 145 in the snapshot bitmap 140 that corresponds to a cluster 195 that was not identified in any MFT record extent field 290, i.e., because it is currently unused, is set to the second, alternative value, e.g., zero (0), or, alternatively, one (1).

In an embodiment once the snapshot scope determiner 130 generates the snapshot bitmap 140 it provides the snapshot bitmap 140, or otherwise makes it available, to the snapshot processor 160 component of the storage stack 155 of the computing device system 100.

In an embodiment the snapshot processor 160 utilizes the snapshot bitmap 140 to scope the snapshot 170 of a volume 150 during a subsequent phase(s) of proactive error scanner 120 processing. In an embodiment subsequent phase of processing for the proactive error scanner 120 the snapshot processor 160, upon receiving the snapshot bitmap 140, or access thereto, or, an updated snapshot bitmap 140, or access thereto, continues to perform copy-on-writes only for those volume clusters 195 whose corresponding bit 145 in the snapshot bitmap 140 are set to the value signifying that the volume cluster 195 is to be snapshotted.

In an embodiment the snapshot processor 160, upon receiving the snapshot bitmap 140, or access thereto, discontinues performing copy-on-writes for those volume clusters 195 whose corresponding bit 145 in the snapshot bitmap 140 is set to the value signifying that the volume cluster 195 is not to be snapshotted. In an embodiment the snapshot processor 160, upon receiving the snapshot bitmap 140, or access thereto, frees the existing clusters 195 in the diff, snapshot, storage 170 for the volume 150 that currently maintains copy-on-writes for volume objects 115 that are stored in clusters 195 whose corresponding bit 145 in the snapshot bitmap 140 are set to the value indicating that the volume cluster 195 is not to be included in the snapshot 170. In this manner clusters 195 utilized by the diff storage, i.e., snapshot, 170 are released for use by other apps 105 and users 180 during this subsequent phase of proactive error scanner 120 processing.

In an embodiment the snapshot processor 160 does not know about, or care about, the contents of any particular cluster 195 that it snapshots during a snapshot maintenance timeframe, e.g., during the processing of the proactive error scanner 120. In an aspect of this embodiment, however, the snapshot processor 160, upon receiving the snapshot bitmap 140, or access thereto, or alternatively an updated snapshot bitmap 140, or access thereto, effectively maintains a snapshot 170 for a volume 150 that contains only system file metadata 175. In this aspect of this embodiment the resultant snapshot 170 is of a significantly smaller size than what is required if the snapshot processor 160 were to continue to perform copy-on-writes and maintain a snapshot 170 for the entire volume 150, i.e., both user data objects 115 and file system metadata objects 115.

In an embodiment, as a result of the snapshot processor 160 maintaining a volume snapshot 170 only for the file system metadata objects 115 of a volume 150 during subsequent phase(s) of proactive error scanner 120 processing there are less copy-on-writes being performed, and thus, file system 190 performance is enhanced.

As previously noted, in an embodiment the snapshot scope determiner 130 is invoked for execution during a first phase of proactive error scanner 120 processing. During this first phase, as the snapshot bitmap 140 has not yet been generated in embodiments, the snapshot processor 160 establishes and maintains a volume snapshot 170 for all the volume's current objects 115, i.e., both file system metadata objects 115 and user data objects 115. Alternatively, during this first phase, as the snapshot bitmap 140 is initialized to indicate that all volume clusters 195 are to be included in the volume snapshot 170, the snapshot processor 160 establishes and maintains a volume snapshot 170 for all the volume's current objects 115.

In these embodiments and alternative embodiments during the first phase of proactive error scanner 120 processing copy-on-writes are performed for each volume object 115 that is written to by an app 105.

However, in an embodiment the first phase of proactive error scanner 120 processing is performed in a timely manner designed to minimize the amount of time in which copy-on-writes for the full volume's objects 115 are performed and maintained.

In an embodiment, if the snapshot scope determiner 130 identifies a corruption in any MFT record 125 the snapshot scope determiner 130 cannot rely on the MFT 110 and its information. In an aspect of this embodiment and situation the snapshot scope determiner 130 will end processing and will not provide a snapshot bitmap 140, or access thereto, to the snapshot processor 160. In an alternative aspect of this embodiment and situation the snapshot scope determiner 130 will end processing and will not provide an updated snapshot bitmap 140, or access thereto, to the snapshot processor 160.

In this embodiment and situation the snapshot processor 160 will continue to maintain the volume snapshot 170 with copy-on-writes for all volume objects 115, both file system metadata 175 and user data 165, for the duration of the proactive error scanner 120 processing.

In alternative embodiments other structures can be utilized for providing the snapshot processor 160 an identification of the volume clusters 195 that the snapshot processor 160 is to scope a currently maintained volume snapshot 170 for, e.g., a list or linked list of extents for file system metadata objects 115, a list or linked list of the free, i.e., non-file system metadata, regions, e.g., clusters 195, of the volume, etc.

Figure 3A:
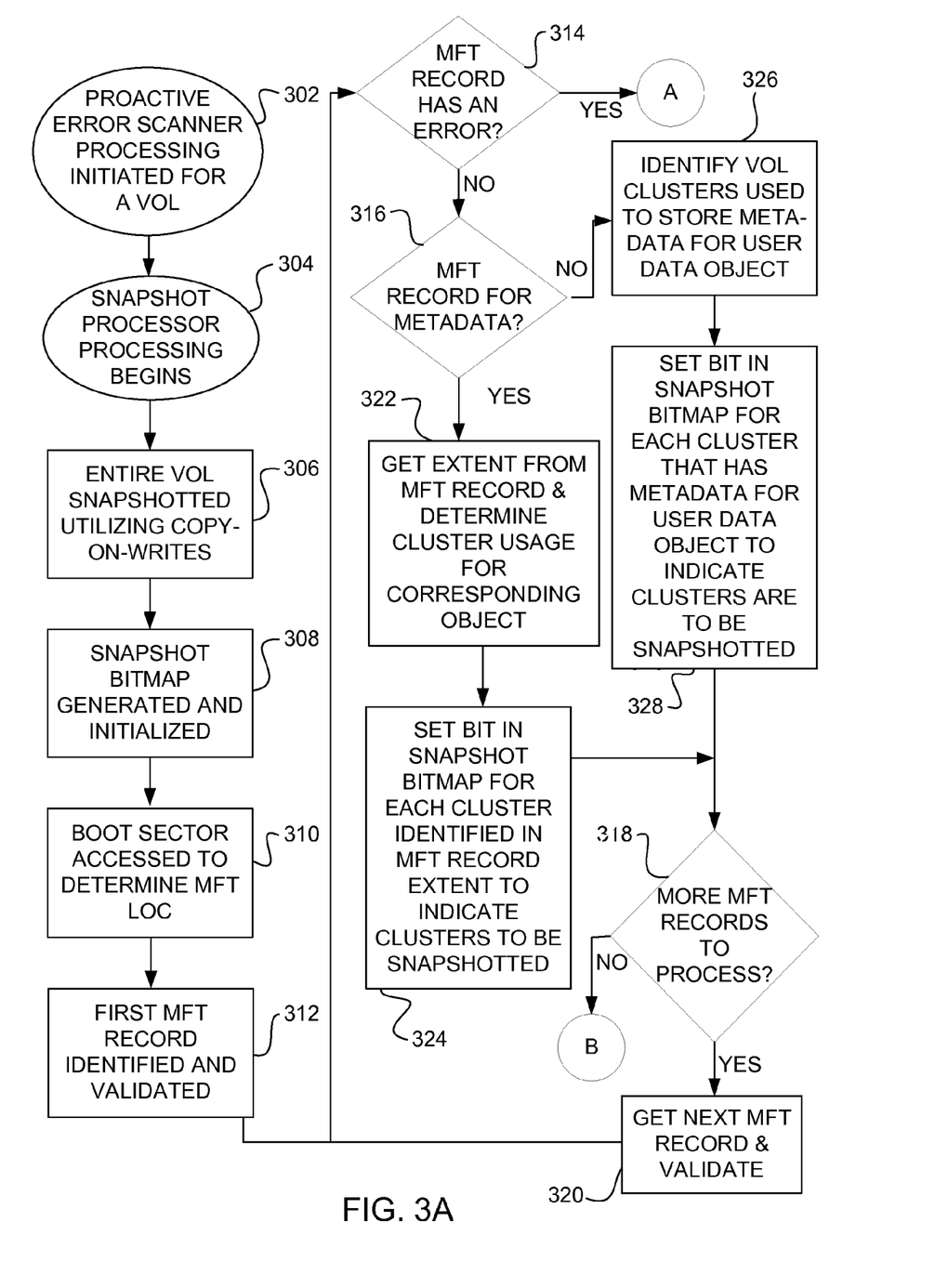
FIGS. 3A-3B illustrate an embodiment logic flow for scoping a volume snapshot for use with proactive error scanning.
Figure 3B:
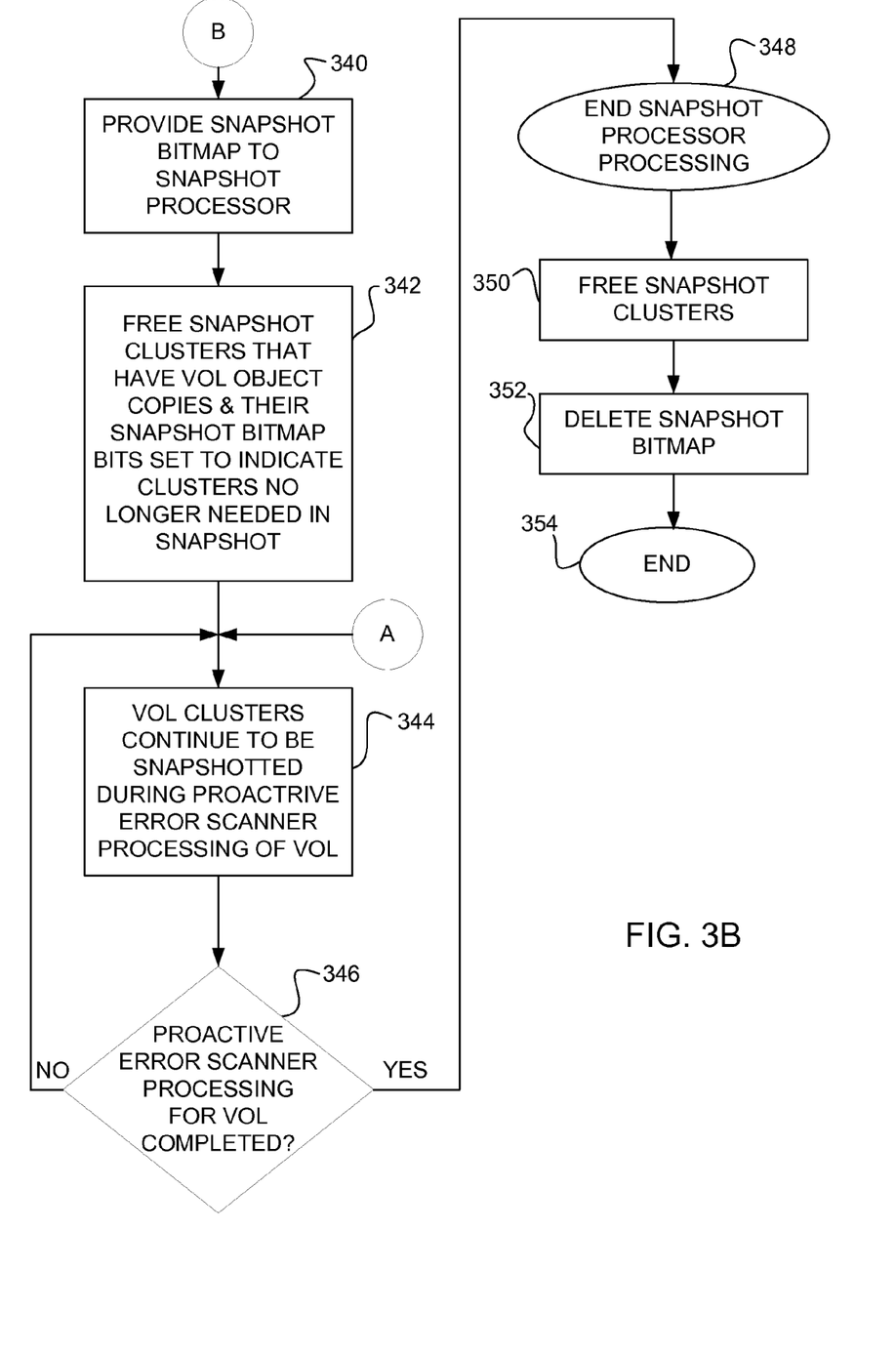

FIGS. 3A-3B illustrate an embodiment logic flow for scoping a volume snapshot 170 for use with proactive error scanning 120. While the following discussion is made with respect to systems portrayed herein the operations described may be implemented in other systems. The operations described herein are not limited to the order shown. Additionally, in other alternative embodiments more or fewer operations may be performed.

Referring to FIG. 3A in an embodiment proactive error scanning processing is initiated to execute for a volume of an embodiment computing device system 302. In an embodiment snapshot processing also begins executing, snapshotting the volume as proactive error scanner processes the volume for corruptions 304.

In an embodiment, during an initial, first, phase of proactive error scanner processing a snapshot is generated and maintained for the entire volume 306. In an aspect of this embodiment snapshot processing utilizes copy-on-writes to snapshot, i.e., copy, file system objects that are changed, i.e., written to, while the proactive error scanner processing is performed 306.

In an embodiment a snapshot bitmap is generated and initialized 308. In first aspect of this embodiment the snapshot bitmap is initialized to zeros in each bit of the bitmap 308. In a second aspect of this embodiment the snapshot bitmap is initialized to ones in each bit of the bitmap 308.

In an embodiment the snapshot bitmap 140 has one entry 145, i.e., bit 145, for each cluster 195 of the volume 150 upon which proactive error scanner 120 is currently processing.

In an embodiment the boot sector of the volume is accessed to determine the WEFT location for the volume being processed 310. In an aspect of this embodiment the boot sector 205 is the first, sector zero (0), of the volume 150. In an aspect of this embodiment the boot sector 205 contains an identification of, or otherwise points to or references, the MFT 110 for the volume 150.

In an embodiment, upon the MFT being located the first record of the MFT is identified and validated 312.

In an embodiment at decision block 314 a determination is made as to whether the current MFT record being validated has an error, i.e., corruption. If no, in an embodiment at decision block 316 a determination is made as to whether the MFT record currently being processed is for file system metadata. In an aspect of this embodiment the object type, i.e., file system metadata 175 or user data 165, can be determined from the object descriptor field 260 of the MFT record 125 currently being processed.

If at decision block 316 the MET record currently being processed is not for file system metadata, i.e., it is for user data, then in an embodiment any volume clusters that are used to store metadata for the user data object are identified 326. In an embodiment each bit in the snapshot bitmap for each cluster that is identified as containing metadata for the user data for which the current MFT record being processed describes, or otherwise identifies, is set to indicate the cluster is to continue to be included in the volume snapshot 328. In a first aspect of this embodiment each such bit is set to one (1) and in a second, alternative, aspect of this embodiment each such bit is set to zero (0) 362.

Referring again to FIG. 3A, in an embodiment at decision block 318 a determination is made as to whether there are any more MFT records to validate and process. If yes, in an embodiment the next MFT record yet to be validated is identified and validated 320. In an embodiment, at decision block 314 a determination is made as to whether this new current MFT record being validated has an error.

If at decision block 316 the MFT record currently being processed is for an object that is file system metadata then in an embodiment the extent field of the MFT record is used to determine the volume cluster usage for the object corresponding to the MFT record 322. In an embodiment the bit in the snapshot bitmap for each cluster identified in the current MFT record's extent field is set indicating the cluster is to continue to be included in the volume snapshot 324. In a first aspect of this embodiment each such bit is set to one (1) and in a second, alternative, aspect of this embodiment each such bit is set to zero (0) 324.

As previously noted, in an embodiment the MFT 110 has a record 125 for every object stored on the respective volume 150, including a record 125 for the boot sector 205 and a record 125 for the MFT 110 itself. In an embodiment both the boot sector 205 and the MFT 110 are file system metadata 175. Thus, in an embodiment when the MFT record for the boot sector is processed and validated 320 the bit in the snapshot bitmap for each cluster identified in the boot sector's MFT record's extent field is set indicating the cluster is to continue to be included in the volume snapshot 324. In this embodiment the cluster(s) 195 containing the boot sector 205 will continue to be included in the scoped volume snapshot 170.

Too, in an embodiment when the MFT record for the MFT itself is processed and validated 320 the bit in the snapshot bitmap for each cluster identified in the extent field of the MFT record for the MFT is set indicating the cluster is to continue to be included in the volume snapshot 324. In this embodiment the cluster(s) 195 containing the MFT 110 will continue to be included in the scoped volume snapshot 170.

In an embodiment control returns to decision block 318 where a determination is made as to whether there are any more MFT records to validate and process.

If at decision block 318 the entire MFT has been processed in an embodiment and referring to FIG. 3B, the snapshot bitmap is provided to, or otherwise made accessible to, the snapshot processor for use in scoping the volume's snapshot during a subsequent proactive error scanner processing phase 340.

In an embodiment the clusters of the snapshot that have volume object copies for which their corresponding snapshot bitmap bits are set to indicate that the cluster is not to continue to be included in the volume snapshot are freed, or otherwise made available, for other, e.g., application, usage 342. In an aspect of this embodiment the clusters 195 of the snapshot 170 that contain copies of a volume object 115 that is user data 165, e.g., a.doc 225, that were generated during a copy-on-write during the first phase of proactive error scanner 120 processing when the entire volume 150 being processed was being snapshotted are freed, or otherwise now made available, for other, e.g., application 105, usage. In this aspect of this embodiment this is because proactive error scanner 120 does not need to reference user data 165 stored on the volume 150 to perform its function of identifying volume corruptions, and thus snapshots, i.e., copies, of user data 165 need not be maintained for proactive error scanner 120 to complete its processing.

In an embodiment volume clusters whose corresponding snapshot bitmap bit is set to indicate the cluster is to continue to be included in the volume snapshot continue to snapshotted, via copy-on-writes, during subsequent phase(s) of proactive error scanner processing 344.

In an embodiment at decision block 346 a determination is made as to whether proactive error scanner processing has completed its processing of the current volume, scanning for corruptions thereon. If no, in an embodiment volume clusters whose corresponding snapshot bitmap bit is set to indicate the cluster is to continue to be included in the volume snapshot continue to snapshotted, via copy-on-writes, during subsequent phase(s) of proactive error scanner processing 344.

If at decision block 346 proactive error scanner processing has completed its processing of the current volume in an embodiment snapshot processing of the volume is concluded 348 as there is no need at this time to continue generating and maintaining a snapshot of the volume. In an embodiment all the clusters of the snapshot for the volume are freed or otherwise now made available, for other, e.g., application, usage 350. In an embodiment the snapshot bitmap for the volume is deleted, or otherwise no longer referenced, 362. In an embodiment the freeing of the clusters of the snapshot 350 and the deletion of the volume snapshot bitmap 352 are components of the deletion of a volume snapshot upon the conclusion of proactive error scanner processing for the respective volume.

In an embodiment processing of the volume, i.e., proactive error scanner processing and scoped volume snapshotting, is now ended 356.

Referring again to FIG. 3A, if at decision block 314 the current MFT record being validated has an error, i.e., corruption, then in an embodiment the MFT cannot be relied upon to correctly determine where file system metadata, and correspondingly, user data, is stored on the current volume being processed by the proactive error scanner. In this situation and embodiment the entire volume 150 will continue to be snapshotted for the duration of the proactive error scanner 120 processing of the volume 150. Referring to FIG. 3B volume clusters whose corresponding snapshot bitmap bit is set to indicate the cluster is to continue to be included in the volume snapshot continue to snapshotted, via copy-on-writes, during subsequent phase(s) of proactive error scanner processing 344.

In this situation and an embodiment all bits 145 of the volume snapshot bitmap 140 that the snapshot processor 160 has been and will continue to utilize will remain set to indicate every cluster, i.e., the entire volume 150, is to remain included in the volume snapshot 170 during the entire proactive error scanner 120 processing.

In this situation and an alternative embodiment all bits 145 of the volume snapshot bitmap 140 are set to indicate every cluster, i.e., the entire volume 150, is to remain included in the volume snapshot 170 during the entire proactive error scanner 120 processing. In this situation and alternative embodiment the snapshot bitmap 140 with all its bits indicating every volume cluster is to remain in the volume snapshot is provided to, or otherwise made accessible to, the snapshot processor for use in scoping the volume's snapshot during subsequent proactive error scanner processing 340.

Computing Device System Configuration

Figure 4:
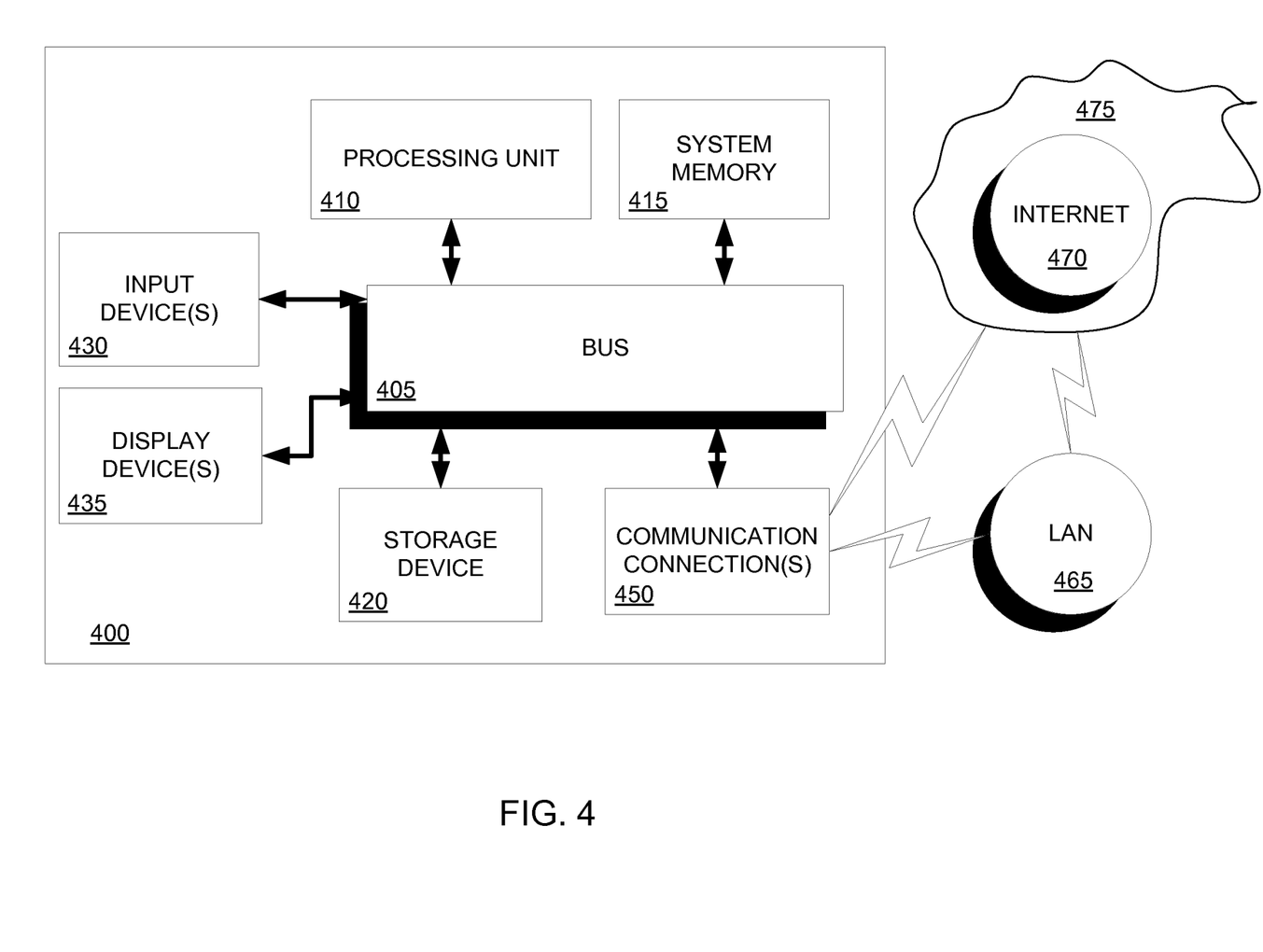
FIG. 4 is a block diagram of an exemplary basic computing device with the capability to process software, i.e., program code, or instructions.

FIG. 4 is a block diagram that illustrates an exemplary computing device system 400 upon which an embodiment can be implemented. Examples of computing device systems, or computing devices, 400 include, but are not limited to, servers, server systems, computers, e.g., desktop computers, computer laptops, also referred to herein as laptops, notebooks, etc.; etc.

The embodiment computing device system 400 includes a bus 405 or other mechanism for communicating information, and a processing unit 410, also referred to herein as a processor 410, coupled with the bus 405 for processing information. The computing device system 400 also includes system memory 415, which may be volatile or dynamic, such as random access memory (RAM), non-volatile or static, such as read-only memory (ROM) or flash memory, or some combination of the two. The system memory 415 is coupled to the bus 405 for storing information and instructions to be executed by the processing unit 410, and may also be used for storing temporary variables or other intermediate information during the execution of instructions by the processor 410. The system memory 415 often contains an operating system and one or more programs, or applications, and/or software code, and may also include program data.

In an embodiment a storage device 420, such as a magnetic or optical disk, solid state drive, flash drive, etc., is also coupled to the bus 405 for storing information, including program code of instructions and/or data, e.g., volumes 150. In the embodiment computing device system 400 the storage device 420 is computer readable storage, or machine readable storage, 420.

Embodiment computing device systems 400 generally include one or more display devices 435, such as, but not limited to, a display screen, e.g., a cathode ray tube (CRT) or liquid crystal display (LCD), a printer, and one or more speakers, for providing information to the computing device's system administrators 180 and users 180. Embodiment computing device systems 400 also generally include one or more input devices 430, such as, but not limited to, a keyboard, mouse, trackball, pen, voice input device(s), and touch input devices, which the system administrators 180 and users 180 can utilize to communicate information and command selections to the processor 410. All of these devices are known in the art and need not be discussed at length here.

The processor 410 executes one or more sequences of one or more programs, or applications, and/or software code instructions contained in the system memory 415. These instructions may be read into the system memory 415 from another computing device-readable medium, including, but not limited to, the storage device 420. In alternative embodiments, hard-wired circuitry may be used in place of or in combination with software instructions. Embodiment computing device system 400 environments are not limited to any specific combination of hardware circuitry and/or software.

The term "computing device-readable medium" as used herein refers to any medium that can participate in providing program, or application, and/or software instructions to the processor 410 for execution. Such a medium may take many forms, including but not limited to, storage media and transmission media. Examples of storage media include, but are not limited to, RAM, ROM, EEPROM, flash memory, solid state drive, CD-ROM, USB stick drives, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 415 and storage device 520 of embodiment computing device systems 400 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device system 400 also includes one or more communication connections 450 coupled to the bus 405. Embodiment communication connection(s) 450 provide a two-way data communication coupling from the computing device system 400 to other computing devices on a local area network (LAN) 465 and/or wide area network (WAN), including the world wide web, or internet, 470 and various other communication networks 475, e.g., SMS-based networks, telephone system networks, etc, Examples of the communication connection(s) 450 include, but are not limited to, an integrated services digital network (ISDN) card, modem, LAN card, and any device capable of sending and receiving electrical, electromagnetic, optical, acoustic, RF or infrared signals.

Communications received by an embodiment computing device system 400 can include program, or application, and/or software instructions and data. Instructions received by the embodiment computing device system 400 may be executed by the processor 410 as they are received, and/or stored in the storage device 420 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method for scoping a volume snapshot for use during corruption detection processing on the volume, wherein the volume is maintained online during corruption detection processing, and wherein the volume has at least one object comprising data of a first data type comprising file system metadata stored thereon and at least one object comprising data of a second data type comprising non-file system data stored thereon, and wherein the volume is comprised of at least two clusters, the method comprising:

reviewing a first data structure comprising information on the objects stored on the volume for an identification of the objects stored on the volume that comprise the first data type, wherein each object stored on the volume is stored in at least one cluster of the volume;

identifying from the first data structure all the clusters of the volume that comprise objects comprising data of the first data type;

generating a second data structure that identifies the locations on the volume where objects stored on the volume comprise the first data type, wherein the second data structure comprises a set of snapshot flags, and wherein each flag corresponds to a respective cluster of the volume, and initializing each flag in the snapshot bitmap to a first value upon the initial generation of the set of snapshot flags, wherein the first value is an indication that the object stored in the corresponding cluster for the flag is not to be included in the snapshot generated for the volume during corruption detection processing;

utilizing the flags of the second data structure to scope a snapshot of the volume during corruption detection processing to generate a scoped snapshot wherein the scoped snapshot comprises objects of only the first data type and wherein the scoped snapshot does not include free space on the volume and does not include objects stored on the volume comprising the second data type; and upon review of the first data structure for an identification of the objects stored on the volume that comprise the first data type, setting each flag in the second data structure, that corresponds to a cluster where an object comprising the first data type is stored, to a second value.

2. The method for scoping a volume snapshot for use during corruption detection processing on a volume of claim 1, wherein corruption detection processing comprises error scanner processing on the volume.

3. The method for scoping a volume snapshot for use during corruption detection processing on a volume of claim 1, wherein the first data structure comprises a master file table and wherein the master file table comprises records for each respective object stored on the volume.

4. The method for scoping a volume snapshot for use during corruption detection processing on a volume of claim 1, wherein any instance of the first value indicates that a corresponding object stored in the corresponding cluster for the corresponding flag is not to be included in the snapshot generated for the volume during corruption detection processing,
   setting each flag that corresponds to a cluster that comprises free space on the volume to the second value.

5. The method for scoping a volume snapshot for use during corruption detection processing on a volume of claim 1, further comprising:
   upon review of the first data structure for an identification of the objects stored on the volume that comprise the first data type, setting each flag that corresponds to a cluster that comprises free space on the volume to the second value.

6. The method for scoping a volume snapshot for use during corruption detection processing on a volume of claim 5, wherein the first data type comprises file system metadata.

7. The method for scoping a volume snapshot for use during corruption detection processing on a volume of claim 6, wherein the second data type comprises user data.

8. The method for scoping a volume snapshot for use during corruption detection processing on a volume of claim 6, wherein the second data type comprises data other than file-system data.

9. The method for scoping a volume snapshot for use during corruption detection processing on a volume of claim 1, wherein the first data type comprises file system metadata and the wherein the second data type comprises user data, the method further comprising:
   for an object comprising a user data object stored on the volume and comprised of data of the second data type, determining that there is metadata stored on the volume for the user data object;
   identifying each cluster on the volume that comprises metadata stored on the volume for the user data object;
   setting each flag that corresponds to each cluster on the volume comprising metadata stored on the volume to a second value, wherein the second value is different than the first value; and
   upon review of the first data structure for an identification of the objects stored on the volume that comprise the first data type, setting each flag, that corresponds to a cluster where an object comprising the first data type is stored, to the second value.

10. The method for scoping a volume snapshot for use during corruption detection processing on a volume of claim 1, wherein the first data type comprises file system metadata and the wherein the second data type comprises user data, the method further comprising:
   reviewing the first data structure for an identification of the data type of each object stored on the volume;
   identifying each cluster on the volume comprising metadata stored on the volume for the user data object;
   maintaining the first value for each flag that corresponds to each cluster on the volume comprising metadata stored on the volume;
   upon review of the first data structure for an identification of the objects stored on the volume that comprise the first data type, setting each flag that corresponds to a cluster that comprises an object comprising data of the second data type to the second value; and
   upon review of the first data structure for an identification of the objects stored on the volume that comprise the second data type, setting each flag that corresponds to a cluster that comprises free space on the volume to the second value.

11. The method for scoping a volume snapshot for use during corruption detection processing on a volume of claim 1, wherein the corruption detection processing comprises at least a first phase and a second phase, the method further comprising:
   reviewing the first data structure for corruptions during the first phase of corruption detection processing;
   reviewing the first data structure for a determination of the objects stored on the volume that comprise the first data type comprising file system metadata during the first phase of corruption detection processing;
   generating the set of snapshot flags during the first phase of corruption detection processing;
   generating the set of snapshot flags during the first phase of the corruption detection processing such that each flag corresponding to a cluster comprising free space is set to the second value; and
   generating the scoped snapshot in the second phase of corruption detection processing.

12. The method for scoping a volume snapshot for use during the corruption detection processing on a volume of claim 11, further comprising, during corruption detection processing, freeing clusters of the volume that comprise objects comprising data of the second data type.

13. The method for scoping a volume snapshot for use during corruption detection processing on the volume of claim 1, wherein the first data structure comprises a table comprising record for respective objects stored on the volume at the time of the corruption detection processing, the method further comprising:
   referencing a boot sector of the volume to identify a location on the volume where the table is stored, wherein the boot sector comprises a cluster of the volume and wherein the table comprises an object comprising data of the first data type comprising file system metadata that is stored in at least one cluster on the volume;
   validating the records to determine if the table has a corruption during corruption detection processing;
   accessing the records of the table to identify the clusters of the volume that store objects comprising data of the first data type during corruption detection processing;
   processing objects of the volume that comprise data of the first data type to determine if the volume has at least one corruption during the corruption detection processing;
   making a determination to not process objects of the volume that comprise data of the second data type comprising user data during corruption detection processing; and
   making a determination to not process clusters of the volume comprising free space during corruption detection processing.

14. A method for scoping a snapshot of a volume for use during proactive error scanner processing on the volume, wherein the volume is maintained online during error scanner processing, wherein the volume has at least one object comprising a first data type comprising file system metadata stored thereon, wherein the volume has at least one object comprising a second data type comprising non file-system metadata stored thereon, wherein the volume is comprised of at least two clusters for storing objects thereon, the method comprising:

identifying the data type for each object stored on the volume;

identifying all the clusters of the volume that comprise objects comprising data of the first data type;

generating a data structure that identifies the locations on the volume where objects stored on the volume comprise the first data type;

generating a snapshot of the volume during a first phase of proactive error scanner processing; and     utilizing the data structure to scope the generated snapshot of the volume during a second phase of error scanner processing to generate a scoped snapshot of the volume wherein the scoped snapshot of the volume comprises copies of objects stored on the volume comprising the first data type and wherein the scoped snapshot of the volume does not include copies of objects stored on the volume comprising the second data type.

15. The method for scoping a snapshot of a volume during error scanner processing on the volume of claim 14, wherein the second data type comprises user data, wherein each object stored on the volume is stored in at least one cluster of the volume, and wherein the data structure comprises a snapshot bitmap comprising at least two bits wherein each bit of the snapshot bitmap corresponds to a cluster of the volume, the method further comprising:

initializing each bit in the snapshot bitmap to a first value upon the initial generation of the snapshot bitmap wherein the first value is an indication that the object stored in the corresponding cluster for the bit is not to be included in the scoped snapshot generated for the volume during corruption detection processing; and     upon identifying a cluster of the volume that comprises an object comprising data of the first data type, setting the bit in the snapshot bitmap that corresponds to the cluster to a second value wherein the second value is different than the first value and wherein the second value is an indication that the object stored in the corresponding cluster for the bit is to be included in the scoped snapshot generated for the volume during corruption detection processing.

16. The method for scoping a snapshot of a volume during proactive error scanner processing on the volume of claim 14, wherein the second data type comprises user data, wherein each object stored on the volume is stored in at least one cluster of the volume, and wherein the data structure comprises a snapshot bitmap comprising at least two bits wherein each bit of the snapshot bitmap corresponds to a cluster of the volume, the method further comprising:

initializing each bit in the snapshot bitmap to a first value upon the initial generation of the snapshot bitmap wherein the first value is an indication that the object stored in the corresponding cluster for the bit is to be included in a snapshot generated for the volume during corruption detection processing; and     upon identifying a cluster of the volume that comprises an object that does not comprise data of the first data type, setting the bit in the snapshot bitmap that corresponds to the cluster to a second value wherein the second value is different than the first value and wherein the second value is an indication that the corresponding cluster for the bit is not to be included in the scoped snapshot generated for the volume during corruption detection processing.

17. A computing device system supporting scoped volume snapshots during corruption detection processing on a volume of the computing device system, wherein each volume of the computing device system comprises at least one cluster for storing objects on the volume, wherein the volume has objects comprising file system metadata stored thereon, wherein the volume has objects comprising non file-system data stored thereon, wherein the volume is comprised of clusters for storing the objects thereon, the computing device system comprising:

a corruption detection processor component comprising the capability to scan a volume of the computing device system for corruptions thereon while the volume remains online and available for access by applications;

a snapshot scope determiner component comprising the capability to identify, during a first phase, the clusters of the volume that are storing objects comprising file system metadata at the time of corruption detection processing on the volume, and to generate a data structure that identifies the locations on the volume where identified objects comprising file system metadata are stored on the volume; and     a snapshot processor component comprising the capability to generate a snapshot of the volume during the first phase and to generate, from the snapshot, during a second phase, a scoped snapshot for the volume by using the data structure to copy only those objects stored in clusters of the volume that have been identified by the snapshot scope determiner as comprising file system metadata during corruption detection processing on the volume.

\* \* \* \* \*